(12) United States Patent
Williams

(10) Patent No.: US 7,478,449 B2
(45) Date of Patent: Jan. 20, 2009

(54) FOLDABLE RAMP WITH IMPROVED HINGE

(75) Inventor: David A. Williams, Milton, FL (US)

(73) Assignee: Daws Manufacturing Co., Inc., Pensacola, FL (US)

( * ) Notice: Subject to any disclaimer, the term of this patent is extended or adjusted under 35 U.S.C. 154(b) by 85 days.

(21) Appl. No.: 11/452,880

(22) Filed: Jun. 14, 2006

(65) Prior Publication Data

US 2007/0289073 A1 Dec. 20, 2007

(51) Int. Cl.
*E01D 15/00* (2006.01)
*E01D 15/12* (2006.01)

(52) U.S. Cl. ..................................... 14/69.5

(58) Field of Classification Search ................ 14/69.5; 414/921, 537; 119/843; D34/32; 296/61; 16/366, 368, 369, 225, 385, 387; 108/162, 108/166, 167; 182/163, 164; 160/236
See application file for complete search history.

(56) References Cited

U.S. PATENT DOCUMENTS

| | | | |
|---|---|---|---|
| 101,908 A | 4/1870 | Outten | |
| 255,809 A | 4/1882 | Pfauntz et al. | |
| 302,102 A | 7/1884 | Chesbro et al. | |
| 872,268 A | 11/1907 | Walton | |
| 963,918 A * | 7/1910 | Miller | 14/69.5 |
| 1,210,133 A * | 12/1916 | Baker | 14/69.5 |
| 1,504,744 A | 8/1924 | Cox | |
| 1,875,922 A | 9/1932 | Harbert | |
| 2,051,726 A | 8/1936 | Lefevre | |
| 2,141,529 A * | 12/1938 | Gravelle | 14/69.5 |
| 2,759,207 A * | 8/1956 | Pennington | 14/69.5 |
| 3,106,826 A * | 10/1963 | Freidel et al. | 405/218 |
| 3,976,209 A | 8/1976 | Burton | |
| 4,157,089 A | 6/1979 | Loughrey | |
| 4,285,514 A * | 8/1981 | Romero | 472/89 |
| 4,528,711 A * | 7/1985 | Packer | 14/69.5 |
| 4,583,618 A | 4/1986 | Zimmerman | |
| 4,761,847 A | 8/1988 | Savage et al. | |
| 4,825,976 A | 5/1989 | Wyse | |
| 4,833,750 A * | 5/1989 | Gherling | 14/27 |
| 5,325,558 A * | 7/1994 | Labreche | 14/69.5 |
| 5,440,773 A | 8/1995 | Lentini | |
| 5,768,733 A * | 6/1998 | Kneebone | 14/69.5 |
| 5,933,898 A * | 8/1999 | Estes et al. | 14/69.5 |
| 5,941,021 A * | 8/1999 | Valls et al. | 49/92.1 |
| 6,139,249 A * | 10/2000 | Lucht | 414/537 |
| 6,185,775 B1 * | 2/2001 | McCarthy | 14/69.5 |
| 6,354,758 B1 | 3/2002 | Chaulk | |
| D478,495 S | 8/2003 | Votruba et al. | |
| 6,983,720 B2 * | 1/2006 | Lakela | 119/165 |
| 7,100,231 B2 * | 9/2006 | Peschmann | 14/69.5 |
| 2002/0078513 A1* | 6/2002 | Schouest | 14/69.5 |
| 2003/0107234 A1* | 6/2003 | Votruba et al. | 296/100.06 |

(Continued)

*Primary Examiner*—Raymond W Addie
(74) *Attorney, Agent, or Firm*—Gray Robinson, P.A.

(57) ABSTRACT

A foldable ramp of the type having two ramp sections each consisting of opposed side rails connected by spaced rungs includes a hinge having a one-piece construction consisting of spaced plates, connected together by one or more ribs, wherein the plates are joined to one another at opposite sides. A sleeve is formed at the juncture of the plates at each side, and a pivot pin extending through each sleeve connects one side of the hinge to a first ramp section and the other side of the hinge to a second ramp section of the foldable ramp.

5 Claims, 3 Drawing Sheets

U.S. PATENT DOCUMENTS

2003/0213072 A1* 11/2003 Myrick et al. ................. 14/69.5
2004/0078929 A1* 4/2004 Schoemann ................... 16/225
2004/0083562 A1* 5/2004 Leblanc ...................... 14/69.5
2005/0055783 A1* 3/2005 Peschmann ................. 14/69.5
2005/0160539 A1* 7/2005 Schomaker et al. .......... 14/69.5
2005/0241083 A1* 11/2005 Morrish ....................... 14/69.5

* cited by examiner

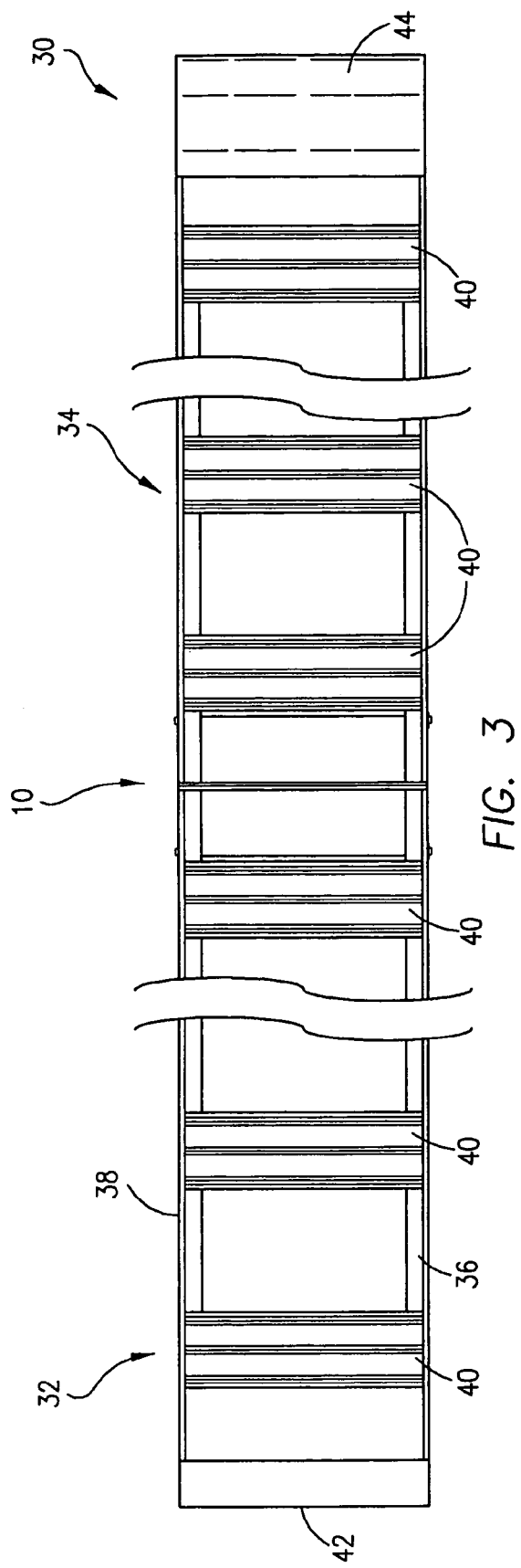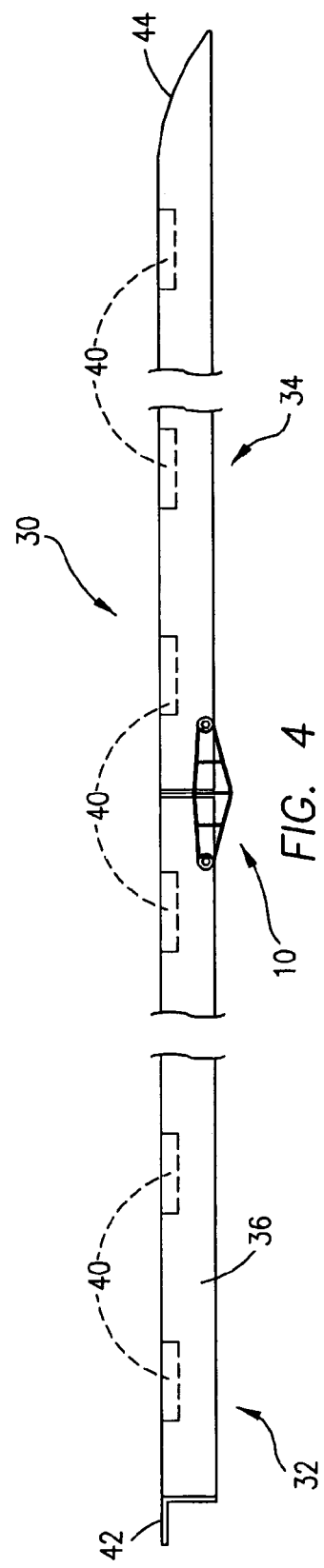

FOLDABLE RAMP WITH IMPROVED HINGE

FIELD OF THE INVENTION

This invention relates to foldable ramps for loading items onto trucks, trailers, vans and the like, and, more particularly, to a foldable ramp having an improved hinge for pivotally connecting two sections of the foldable ramp which is strong, light-weight and allows the ramp sections to be readily unfolded for use and folded for storage.

BACKGROUND OF THE INVENTION

Small mobile equipment such as riding lawn mowers, all-terrain vehicles (ATVs) and the like are often transported from place to place in the bed of pickup trucks, vans, trailers or other vehicles. It is possible to physically lift such items into a truck bed, for example, but more than one individual is usually needed and injuries can result from the effort. As a consequence, foldable ramps have been developed for loading such items which generally resemble a ladder having opposed side rails connected by a number of spaced rungs. One end of the ramp rests against the truck bed or ramp, and the other end contacts the ground. See for example, U.S. Pat. No. 5,440,773.

There are several considerations in the design of foldable ramps to make them practical and user friendly. Weight is one important factor. The ramp must be easy to position against a vehicle or trailer and store. For example, spaced rungs are preferable to a continuous ramp surface in order to reduce weight. Additionally, the ramp must be long enough to provide a relatively gradual slope or angle between the ground and the vehicle or trailer so that a riding lawn mower, ATV or the like may be safely driven up the ramp.

In most designs, foldable ramps are formed in two sections connected by a hinge. This allows the ramp to be unfolded for use and folded in a relatively compact configuration for storage. The hinge connection between the two ramp sections has presented problems in prior designs. The hinge must be light weight yet strong, and easy to fabricate. The hinge element shown in U.S. Pat. No. 5,440,773, for example, is difficult and expensive to fabricate. There is a need for improved hinge designs for foldable ramps.

SUMMARY OF THE INVENTION

This invention is directed to foldable ramps of the type having two ramp sections each consisting of opposed side rails connected by spaced rungs. An improved hinge is provided having a one-piece construction consisting of spaced plates, connected together by one or more ribs, wherein the plates are integrally joined to one another at opposite sides. A sleeve is formed at the juncture of the plates at each side, and a pivot pin extending through each sleeve connects one side of the hinge to a first ramp section and the other side of the hinge to a second ramp section of the foldable ramp. The hinge of this invention is an improvement over prior designs. Its one-piece construction is light-weight and strong, but relatively easy to fabricate.

BRIEF DESCRIPTION OF THE DRAWINGS

The structure, operation and advantages of the presently preferred embodiment of this invention will become further apparent upon consideration of the following description, taken in conjunction with the accompanying drawings, wherein:

FIG. 3 is a partial, plan view of a foldable ramp incorporating the hinge herein; and FIG. 4 is a side view of the foldable ramp and hinge depicted in FIG. 3.

DETAILED DESCRIPTION OF THE INVENTION

Figure 1:
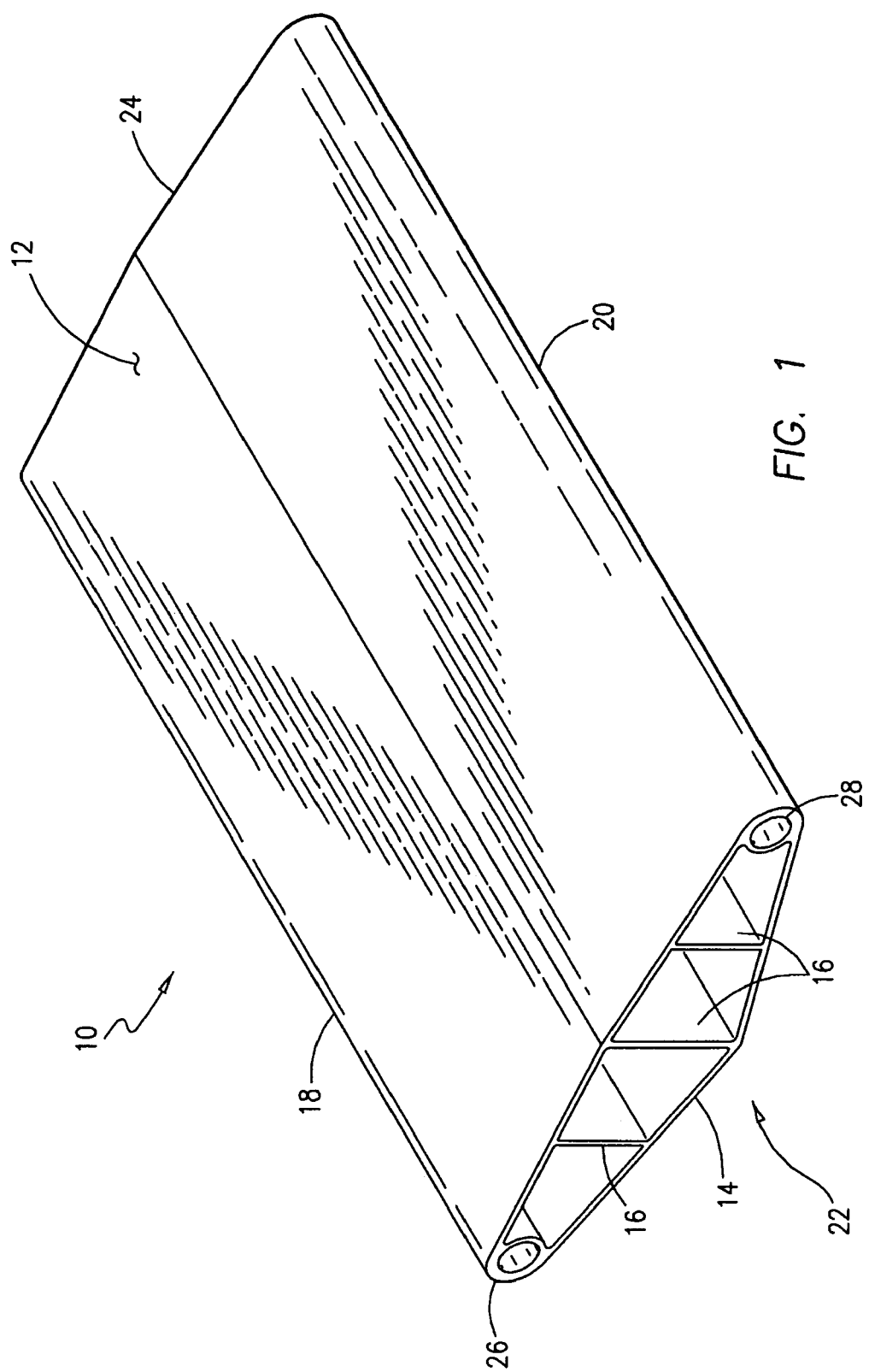
FIG. 1 is a perspective view of the hinge of this invention.

Referring now to the Figs., the hinge 10 of this invention comprises a first plate 12, a generally V-shaped second plate 14 and three ribs 16 extending between and connecting the plates 12, 14. While three ribs 16 are depicted in the Figs., it should be understood that a greater number of ribs 16 could be employed to increase strength on the one hand, for example, or a lesser number of ribs 16 could be used to reduce weight on the other hand. The first and second plates 12, 14 are joined together along their side edges 18 and 20, and open at their opposed ends 22 and 24. A sleeve 26 is integrally formed at the juncture of plates 12, 14 along the length of side edge 18, and another sleeve 28 is integrally formed at the juncture of plates 12, 14 along the length of side edge 20. In the presently preferred embodiment, the first and second plates 12, 14, the ribs 16 and the sleeves 26, 28 are fabricated in an essentially one-piece construction which simplifies manufacturing, reduces cost and produces a light weight yet strong structure.

Figure 2:
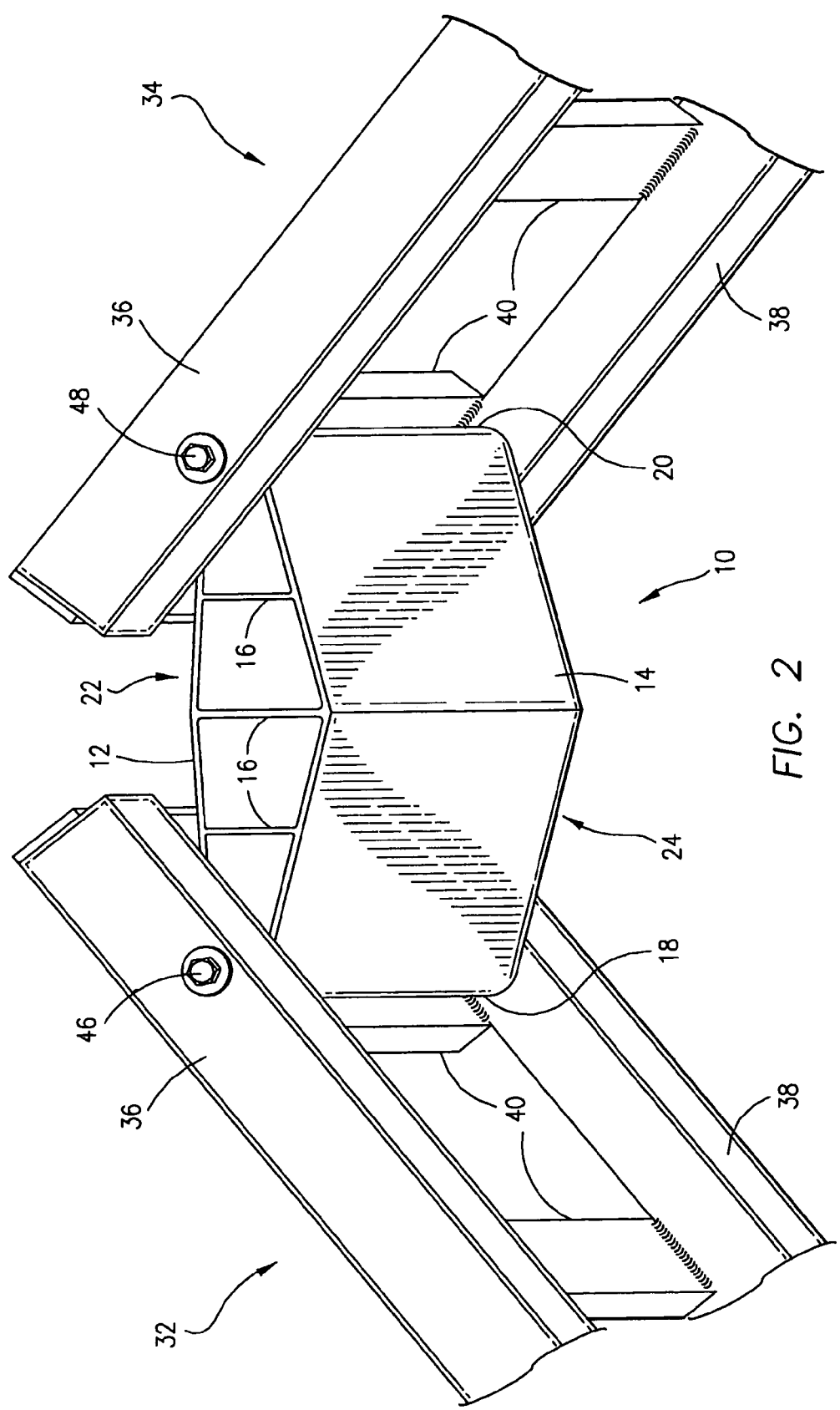
FIG. 2 is a partial side view of the hinge connected to the end of each of two ramp sections which form a foldable ramp.

The hinge 10 is intended to be used with a foldable ramp 30 of the type shown in FIGS. 2-4. The ramp 30 comprises two ramps sections 32 and 34 each having a side rail 36, a side rail 38 and a number of spaced rungs 40 extending between and connected to the side rails 36, 38. The ramp section 32 preferably includes an angle bracket 42 at one end, or other structure such as spaced fingers (not shown), which can extend onto the bed or tailgate of a truck, for example, to help secure the ramp 30 in place when in use. A lip 44 is preferably attached at an end of the second ramp section 34 to engage the ground. Conventionally, the ramp 30 is formed of light-weight aluminum or the like.

The ends of the ramp sections 32 and 34 opposite the angle bracket 42 and lip 44, respectively, are pivotally connected to one another by the hinge 10. The hinge 10 is located with respect to the ramp sections 32, 34 such that the end 22 of hinge 10 abuts respective side rails 36 of the ramp sections 32, 34, and the end 24 of hinge 10 abuts respective side rails 38 of ramp sections 32, 34. The side rails 36 and 38 of ramp section 32 are formed with bores (not shown) which align with the sleeve 26 of hinge 10, and the side rails 36, 38 of ramp section 34 are formed with bores (not shown) which align with the sleeve 28 of hinge 10. With the hinge 10 in such position, a pivot pin 46 is inserted through the side rail 36, sleeve 26 and side rail 38 of rail section 32 where it is secured in place. Similarly, a pivot pin 48 is inserted through the side rail 36, sleeve 28 and side rail 38 of rail section 34 and secured in place.

The hinge 10 permits pivotal movement of the ramp sections 32 and 34 relative to one another between an extended position depicted in FIGS. 3 and 4, and a folded position as partially shown in FIG. 2. The hinge 10 is at least as strong as the ramp sections 32, 34 themselves, is light weight and durable.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A foldable ramp, comprising:
   a first ramp section and a second ramp section, each of said first and second ramp sections having opposed side rails connected by a number of spaced rungs;
   a hinge pivotally connected between said first ramp section and said second ramp section, said hinge including a first plate having opposed side edges and a second plate having opposed side edges which is spaced from said first plate, said first and second plates being connected to one another along said opposed side edges thereof to form a hollow interior, at least one rib located within said hollow interior and being connected between said first and second plates, a sleeve being formed at the juncture of said first and second plates along each side edge thereof and being located within said hollow interior, said first plate, said second plate, said at least one rib and said sleeves being formed in a one-piece assembly;
   a first pivot pin extending through one of said sleeves and being connected to each of said side rails of said first ramp section, and a second pivot pin extending through the other of said sleeves and being connected to each of said side rails of said second ramp section.

2. The foldable ramp of claim 1 in which one of said first and second plates is generally V-shaped.

3. The foldable ramp of claim 1 in which said at least one rib is three ribs each extending between said first and second plates along the length thereof.

4. The foldable ramp of claim 1 further including a bracket mounted to said first ramp section, said bracket being adapted to engage the bed or tailgate of a truck.

5. The foldable ramp of claim 1 further including a lip mounted to said second ramp section, said lip being adapted to engage the ground.

* * * * *